(12) United States Patent
Enyedy

(10) Patent No.: US 7,176,411 B2
(45) Date of Patent: Feb. 13, 2007

(54) WIRE FEEDER

(75) Inventor: Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 218 days.

(21) Appl. No.: 10/800,928

(22) Filed: Mar. 15, 2004

(65) Prior Publication Data

US 2005/0199606 A1    Sep. 15, 2005

(51) Int. Cl.
B23K 9/12    (2006.01)
B65H 49/00   (2006.01)

(52) U.S. Cl. ............... 219/137.2; 226/181; 242/129.5

(58) Field of Classification Search ............ 219/137.2, 219/137.7; 226/181, 186, 187; 242/564.4, 242/597.8, 129, 129.5
See application file for complete search history.

(56) References Cited

U.S. PATENT DOCUMENTS

| | | | |
|---|---|---|---|
| 3,562,577 A * | 2/1971 | Kensrue ................... 314/71 |
| 4,508,954 A | 4/1985 | Kroll | |
| 4,665,300 A * | 5/1987 | Bellefleur ............... 219/137.2 |
| 4,720,044 A * | 1/1988 | Stemwedel, Jr. ............. 239/84 |
| 5,060,882 A * | 10/1991 | Rousculp et al. ........ 242/421.3 |
| 5,410,126 A | 4/1995 | Miller et al. | |
| 5,500,512 A * | 3/1996 | Goldblatt .................... 235/375 |
| 5,836,539 A * | 11/1998 | Grimm et al. ........... 242/615.3 |
| 6,057,526 A * | 5/2000 | Lee .......................... 219/145.1 |
| 6,213,375 B1 | 4/2001 | Rybicki | |
| 6,225,596 B1 | 5/2001 | Chandler et al. | |
| 6,568,578 B1 * | 5/2003 | Kensrue ..................... 226/176 |
| 6,596,972 B1 * | 7/2003 | Di Novo et al. ......... 219/137.9 |
| 6,705,563 B2 * | 3/2004 | Luo et al. .................... 242/557 |
| 6,750,429 B2 * | 6/2004 | Bogner et al. .............. 219/136 |
| 6,897,406 B2 * | 5/2005 | Crisler et al. ............. 219/130.1 |
| 7,034,250 B2 * | 4/2006 | Kensrue ................... 219/137.7 |
| 2004/0200819 A1 * | 10/2004 | Kensrue .................. 219/137.7 |

* cited by examiner

Primary Examiner—Kevin P. Kerns
(74) Attorney, Agent, or Firm—Fay Sharpe LLP

(57) ABSTRACT

A wire feeder for supplying consumable welding wire to a welding gun includes a housing and a wire advancing mechanism connected to the housing for paying wire from a wire spool to a welding gun. A storage tray is formed with the housing. A wire spool support is connected to the housing and rotatably supports the wire spool. The wire spool support includes a wire spool support tray, an elevated member extending from the wire spool support tray, and a spool retention member connected to the elevated member and rotatably supporting the wire spool.

31 Claims, 4 Drawing Sheets

WIRE FEEDER

BACKGROUND OF THE INVENTION

1. Field of the Invention

The present invention relates to wire feeders and, more particularly, to a wire feeder which advances a consumable welding wire electrode to a welding gun used in a welding operation wherein the location of the welding operation does not necessarily remain constant.

2. Description of the Art

It is known that wire can be used an effective welding consumable. When used in a welding operation, welding wire typically forms a part of a welding electrode and contributes to a weld pool as filler material. Wire feeders are used to advance such a welding wire in a consistent and controllable manner to a welding gun for use in the welding operation. Preferably, the wire feeder is able to accurately direct the welding wire to a weld point of a particular welding operation at a controlled and, optionally, adjustable rate.

Portable wire feeders are often used when the location of the welding operation or operations is likely to change or does not always remain constant. This might include, for example, welding operations at job sites that change day-to-day or welding operations that cover a large area at a single job site. Examples of portable wire feeders are generally taught in the following U.S. patents: Bellefleur U.S. Pat. No. 4,665,300; Rybicki U.S. Pat. No. 6,213,375; Kroll U.S. Pat. No. 4,508,954; Chandler U.S. Pat. No. 6,225,596; Miller U.S. Pat. No. 5,410,126; and Grimm U.S. Pat. No. 5,836,539, all expressly incorporated herein by reference.

Preferably, portable wire feeders are able to supply their respective welding operations with welding wire in a manner much like that of a conventional stationary wire feeder. This is often more difficult in the portable wire feeder because it is likely to be subjected to repeated movement and use in connection with a wide range of work environments, many of which can be severe. In contrast, conventional stationary wire feeders are often used in controlled and unchanging environments, such as a work shop or factory floor. In addition to functioning like a stationary wire feeder, the portable wire feeder is preferably compact and lightweight enabling it to be more easily moved and used in confined work areas.

Other desirable characteristics of portable wire feeders are ruggedness and durability. As mentioned, the portable wire feeder may be subject to constant or at least some movement and may be used in many adverse conditions. Moving the portable wire feeder may subject it to impact forces not typically seen by a stationary wire feeder. For example, the portable wire feeder encounters impact forces when it is merely placed on a surface and when it is transported in a work vehicle. Additionally, each time the portable wire feeder is moved, there is a risk that the feed will be dropped or impacted by other objects. Adverse conditions and harsh work environments may have degrading effects on the portable wire feeder and desirably the portable wire feeder is able to withstand such conditions and environments.

Ruggedness and durability in portable wire feeders can be achieved by protecting working components thereof. For example, wire feeders typically include a wire advancing mechanism. To the extent possible, it is desirable to protect the wire advancing mechanism during normal working conditions while permitting easy access for minor repairs and/or adjustments. Still another desirable characteristic of a portable wire feeder is its ease of use when a user is wearing protective gear. Users of portable wire feeders typically wear, among other protective gear, gloves and face/eye protection. The portable wire feeder should be easy to use even with protective gloves and the controls should be easily accessible and controllable by a user wearing protective gear.

Still additional characteristics that are desirable in portable wire feeders are use with various types of weld wire carriers and ease of replacing a depleted supply of welding wire. As is well known, welding wire is often stored and transported in bulk. Bulk supplies or carriers of welding wire include spools, boxes and canisters. Preferably, the portable wire welder is versatile enough that it can be readily supplied by any of these and other types of bulk wire carriers. Moreover, the welder is preferably designed to be able to readily switch from one type of bulk supply to another. For example, if the welder is supplied by a canister of weld wire and all the weld wire is used from the canister, it is desirable that the welder be able to be readily adapted to receive wire from a spool of welding wire.

Yet another desirable characteristic in a portable wire feeder is the provision of one or more storage areas formed as part of the wire feeder. A storage area would permit a use of the portable wire feeder to store and transport various tools and parts for use in conjunction with the portable wire feeder or other tasks to be carried out at the same general location as the welding operation. Thus, storage areas would increase the functionality of the portable wire feeder.

SUMMARY OF THE INVENTION

The present invention provides a wire feeder that overcomes the foregoing difficulties and others and provides the aforementioned and other advantageous features. In accordance with one aspect of the present invention, a wire feeder is provided for supplying consumable welding wire to a welding gun. More particularly, in accordance with this aspect of the invention, the wire feeder includes a housing and a wire advancing mechanism connected to the housing for paying wire from a wire spool to a welding gun. A storage tray is formed with the housing. A wire spool support is connected to the housing and rotatably supports the wire spool. The wire spool support includes a wire spool support tray, an elevated member extending from the wire spool support tray, and a spool retention member connected to the elevated member and rotatably supporting the wire spool.

In accordance with another aspect of the present invention, a wire feeder is provided for supplying consumable welding wire to a welding gun. More particularly, in accordance with this aspect of the invention, the wire feeder includes a housing, a wire advancing mechanism connected to the housing for moving wire from a wire supply to a welding gun and a tray integrally formed with the housing.

In accordance with yet another aspect of the present invention, a wire feeder is provided for supplying consumable welding wire to a welding gun. More particularly, in accordance with this aspect of the invention, the wire feeder includes a housing for a wire feeder and an advancing mechanism for paying wire through the housing to a welding gun. A wire spool support is connected to the housing and rotatably supports a wire spool having wire thereon that is connected to the advancing mechanism. The wire spool support includes a bin, an elevated member extending from the bin, and a spool retention member connected to the elevated member and rotatably supporting the wire spool.

BRIEF DESCRIPTION OF THE DRAWINGS

The invention may take physical form in various components and arrangements of components. The drawings are only for purposes of illustrating one or more preferred embodiments of the invention and are not to be construed as limiting the invention.

DETAILED DESCRIPTION OF THE PREFERRED EMBODIMENT(S)

Figure 1:
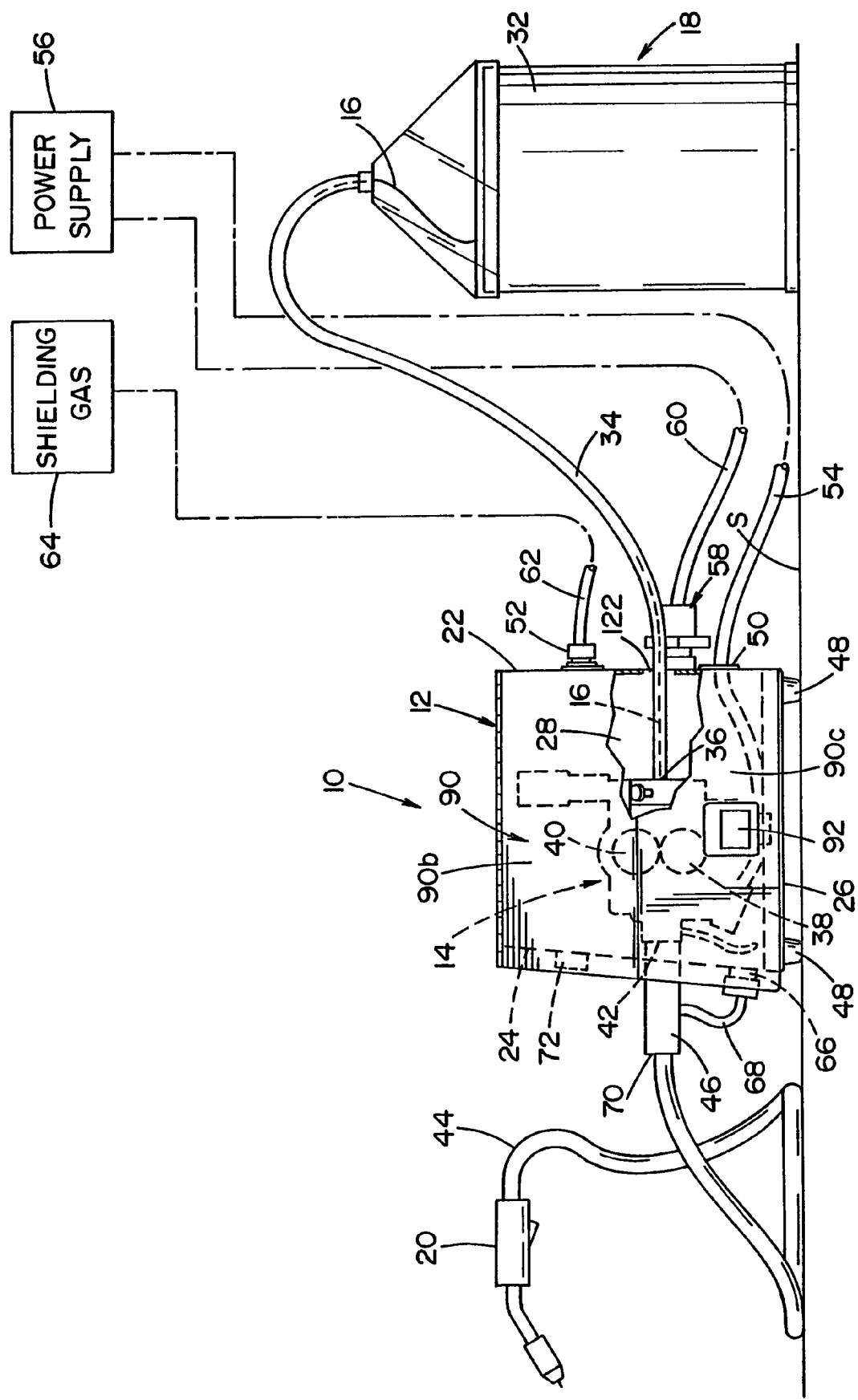
FIG. 1 is a side elevational view portable wire feeder in accordance with one preferred embodiment of the present invention.
Figure 2:
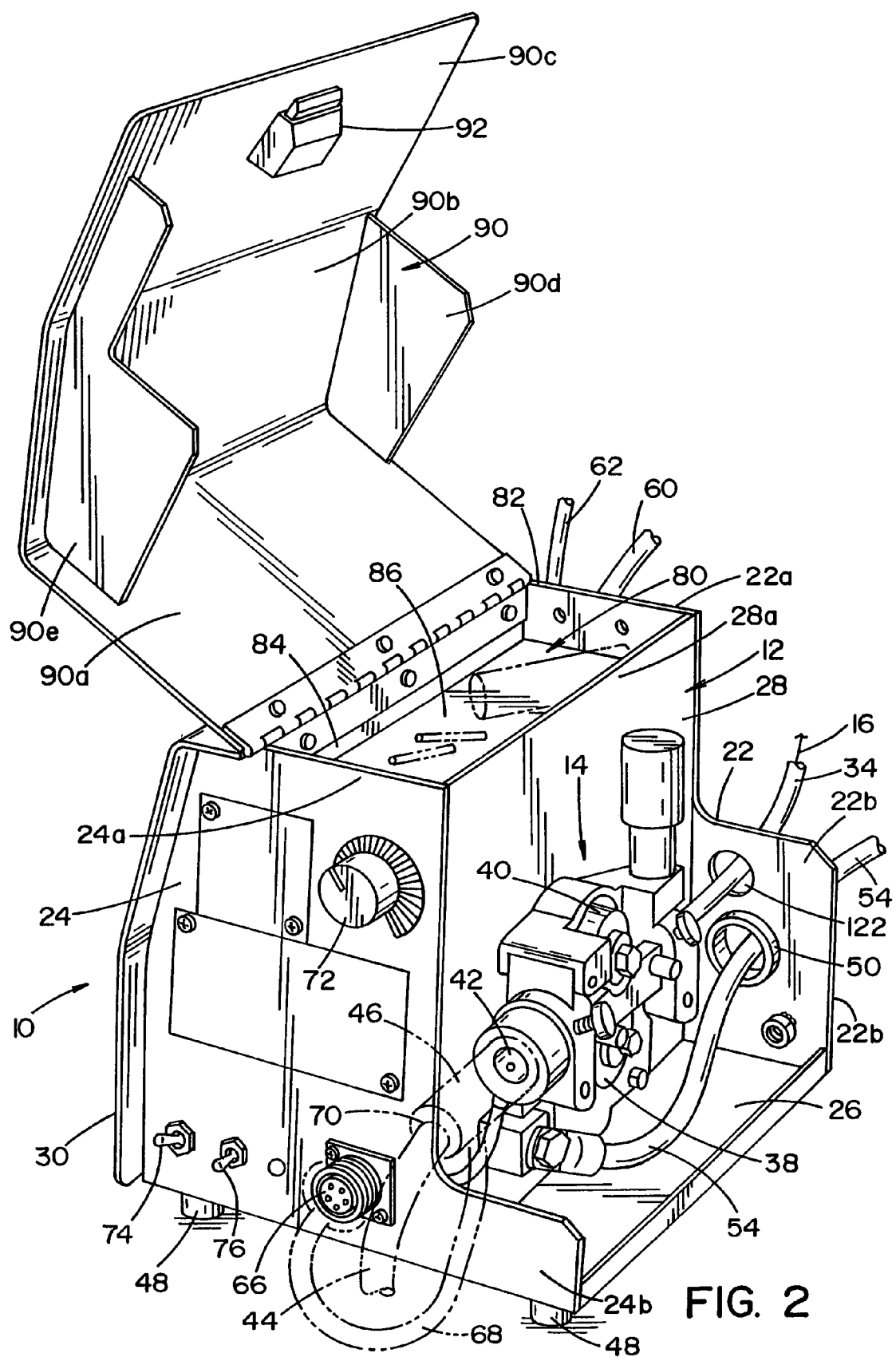
FIG. 2 is a perspective view of the portable wire feeder of FIG. 1 shown with a cover open to reveal a wire advancing mechanism.

Referring now to the drawings wherein the showings are for purposes of illustrating one or more preferred embodiments of the invention only and not for purposes of limiting the same, FIGS. 1 and 2 show a portable wire feeder for supplying consumable welding wire to a welding gun generally designated by reference numeral 10 in accordance with one preferred embodiment of the present invention. The portable wire feeder includes a housing 12 and a wire advancing mechanism 14 connected to the housing 12 for moving wire 16 from a wire supply 18 to a welding gun 20. In one preferred embodiment, the housing 12 is fabricated from sheet metal.

The housing 12 includes a rearward housing end wall 22 and a forward housing end wall 24 spaced apart from the rearward housing end wall 22. The housing further includes a base wall 26 extending between the walls 22,24. A dividing wall 28 and a side wall 30 also extend between the forward and rearward housing end walls 22,24. The dividing wall 28 and the side wall 30 are spaced from one another and both are approximately normal to the base wall 26. The wire advancing mechanism 14 is positioned between planes generally defined by each of the walls 22,24. Further, the wire advancing mechanism 14 is positioned adjacent and mounted to one side (a side opposite that facing the side wall 30) of the dividing wall 28 and above the base wall 26.

In the illustrated embodiment, the wire supply 18 is a canister 32 of coiled wire 16 that is delivered or supplied into the rearward housing end wall 22 to the wire advancing mechanism 14. More particularly, the wire 16 is pulled from the canister 32 and through a wire guide tube 34 by the wire advancing mechanism 14. The wire guide tube 34 directs the pulled wire 16 and reduces the likelihood of the wire 16 catching in route to the wire advancing mechanism 14. Of course, as will be discussed in more detail below and is known by those skilled in the art, the wire supply 18 can alternately be any other type of welding wire source, including, for example, a wire spool or a box of spooled wire.

The wire advancing mechanism 14 includes an inlet 36 shaped to receive the welding wire 16 from the guide tube 32 and a plurality of pinch rollers 38,40 to direct the wire 16 toward an outlet 42. The outlet 42 is connected to another wire guide tube 44 which extends from the forward end wall 24 of the housing 12 and directs the advanced wire to the welding gun 20. More particularly, the outlet 42 connects directly to a head 46 from which the wire guide tube 44 extends. The wire guide tube 44 is sufficiently long enough to allow a user to freely move about a larger welding area while the feeder housing 12 generally remains stationary or at a set point. The housing 12 includes feet 48, which may be formed of a rubber-like material or have a rubber-like cover thereon, on a bottom portion thereof for resting the feeder 10 on an underlying surface S and resisting movement thereabout. Further details on the wire advancing mechanism 14 and wire straightening devices, often employed therewith, are not given in that they are known in the art.

In order to provide a convenient and easily movable welding package, the portable wire feeder 10 also includes a power supply inlet 50 and a gas supply inlet 52, both in the rearward end wall 22. An electrical power cord or cable 54 extends from the rearward end wall 22. More specifically, power cable 54 has a first end connected to the wire advancing mechanism 14 and the wire guide tube 44, a portion passing through the inlet 50 and a second end connected to a power supply 56. The power cable 54 serves to electrically connect the gun 20 to the power supply 56 and provide an electric current thereto. Although not illustrated, the inlet 50 can alternately be a connector that allows a portion of the cable 54 adjacent the power supply 56 to be selectively disconnected and reconnected to the feeder 10.

The portable feeder 10 additionally includes a cable connector 58, also in the rearward end wall 22. A control cable 60 extends from the rearward wall 22 and selectively connects the feeder 10, through connector 58, to the power supply 56. In one embodiment, the control cable 60 provides electric power to the feeder 10 for the feeder's various controls and the power cable 54 provides high current electrical power to the gun 20 for welding. The connector 58 is optionally like the cable coupler of commonly owned, copending U.S. patent application Ser. No. 10/619,764 entitled "Cable Connector for Welder or Wire Feeder" and filed on Jul. 15, 2003, expressly incorporated herein by reference. Alternatively, although not shown, the cables 54,60 could be combined into a single cable and connected to the feeder 10 at a single outlet location. Regardless of the precise configuration of the electric cable or cables, in one preferred embodiment, the feeder 10 operates over a wide voltage range, such as, for example, 34–50 volts AC or 40 volts DC.

A gas hose 62 also extends from the rearward end wall 22 and fluidly connects the feeder 10 to a shielding gas supply 64. Having the cables 54,60 and the hose 62 extend from the rearward end wall 22 of the housing 12, opposite the forward end wall 24 from which the wire guide tube 44 extends, provides improved movement characteristics to the feeder 10 and helps keep these connectors away from any welding operation and the spatter produced therefrom.

The forward end wall 24 includes an outlet 66 which supplies electrical power necessary for the welding operation. A cable 68 electrically connects the outlet 66 to the electrode head 46 which extends forwardly from the wire advancing mechanism 14 and provides the electrical connection between the welding power supply and the welding operation. The head 46 is secured to the feeder 10 and has an outlet 70 connected to the wire guide tube 44. Since the wire feeder 10 may often be pulled by the tube 44, the connection between the tube 44 and the head 46 optionally includes strain relief (not shown) and the connection between the welding gun 20 and the tube optionally includes strain relief (not shown).

The walls 22,24,26,28,30 protect internal components of the feeder 10. More particularly, wire feeder control mechanisms (not shown) are contained in the housing 12 between the walls 22,24 and 26,28. Controls 72,74,76 are provided on the forward housing end wall 24 which operatively connect to the wire feeder control mechanisms contained in the housing 12 for control thereof. In the illustrated embodiment, control knob 72 is a calibrated wire feed speed knob that controls the speed at which the wire advancing mechanism 14 provides wire 16 to the gun 20. Control switch 74 is a two-step/interlock switch and control switch 76 is a cold feed/gas purge switch. Of course, the functions of the control knobs 72,74,76 could be modified and/or additional or fewer control knobs or the like could be provided on the feeder 10.

The feeder 10 additionally includes a storage tray 80, also referred to herein as a housing bin. In the illustrated embodiment, the tray 80 is built-in or integrally formed with the housing 12 and is suitable for storing and/or transporting miscellaneous tools or items, including those typically carried by a user of a portable wire feeder. More particularly, the tray 80 is formed in an upper portion of a housing adjacent an upper end 82 of the housing 12 and shares walls with the housing 12, i.e., walls of the tray 80 are also walls of the housing 12.

Specifically, a portion 24a of the forward housing end wall 24 integrally forms a first tray end wall and a portion 22a of the rearward housing end wall 22 integrally forms a second tray end wall, opposite and spaced apart from the first tray end wall 22a. A portion 28a of the dividing wall 28 also integrally forms a tray side wall extending between the first and second tray end walls 22a,24a. Another tray side wall 84, opposite and spaced apart from the tray side wall 28a, extends between the end walls 22a,24a. The tray 80 includes a base wall 86 that is spaced apart from the upper end 82 of the housing 12 to define a depth into the housing 12 for the tray 80. Thus, the walls 22a,24a,28a,84 and the base wall together form the tray 80 that is accessible through an open end provided at the housing upper end 82. Optionally, the base 86 can be extended to the housing side wall 30 and the wall 84 removed.

The feeder 10 further includes a cover or door 90 pivotally connected to the housing 12 adjacent the housing side wall 30 and the housing upper end 82. The cover 90 is selectively moveable between (i) a closed position wherein the tray 80 and the wire advancing mechanism 14 are covered and/or enclosed and (ii) an open position wherein the tray 80 and the wire advancing mechanism are accessible. The cover 90 includes a tray portion 90a that closes an open end of the tray 80 when the cover 90 is in its closed position to prevent egress of items resting in the tray 80.

Remaining portions of the cover 90, including vertical portions 90b,90c and end portions 90d,90e, cooperate with the housing 10 to cover or enclose the wire advancing mechanism 14. The vertical portions 90b,90c encloses a side of the mechanism 14 that is opposite the dividing wall 28. The end portions 90d,90e cooperate with end wall portions 22b,24a to enclose respective ends of the wire advancing mechanism. The cover portions 90a,90b,90c,90d,90e are arranged so that when the cover 90 is in the open position, the portions are remotely spaced from the wire advancing mechanism 14 which allows relatively easy and/or ample access thereto. In one preferred embodiment, the cover 90 is formed from 14 GA steel but, of course, the cover could be constructed of alternate materials. Moreover, in the preferred embodiment, the portion 90c includes a handle 92 for opening and closing the cover 90.

Figure 3:
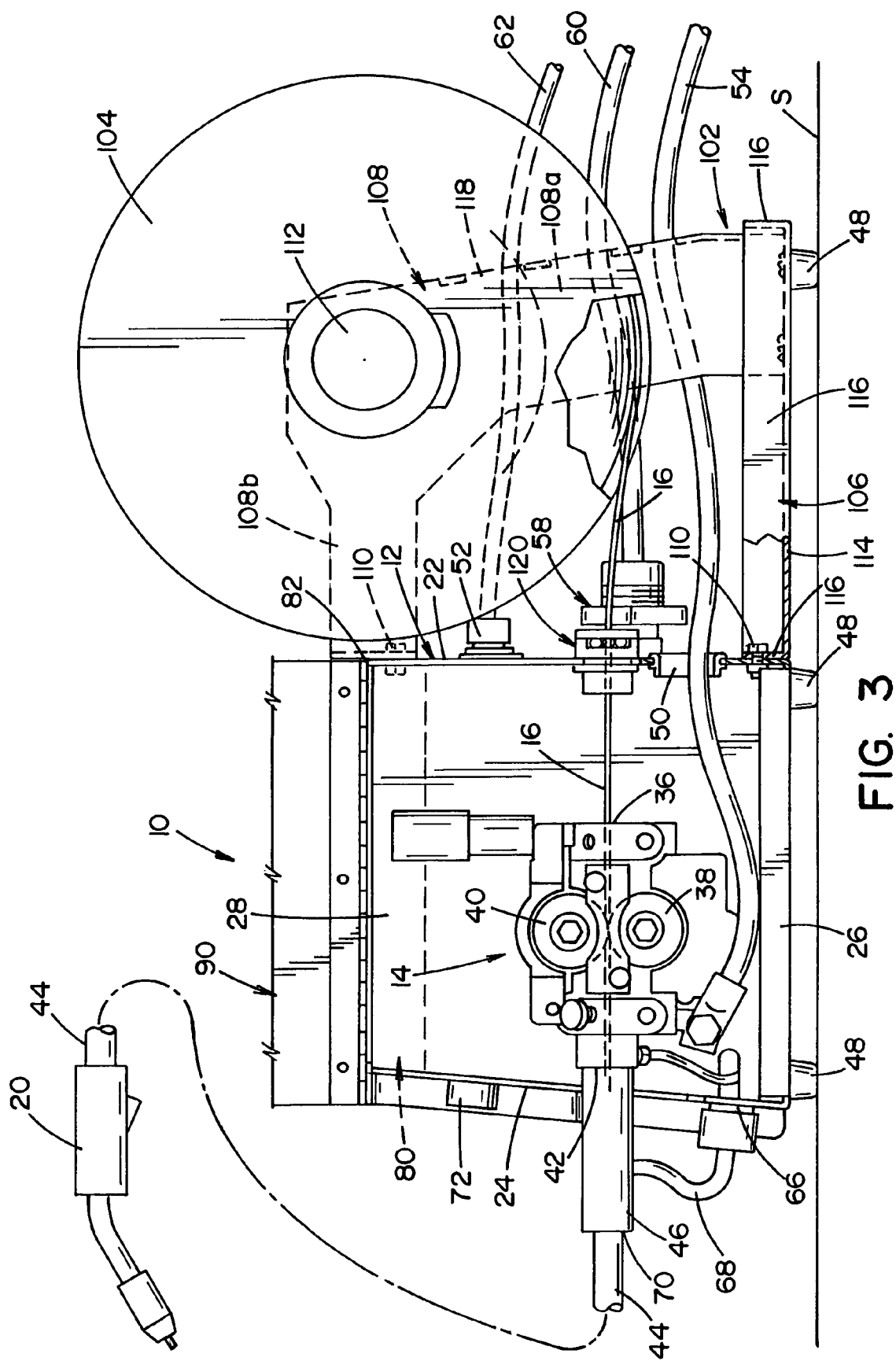
FIG. 3 is a side elevational view of a portable wire feeder in accordance with another preferred embodiment of the present invention.
Figure 4:
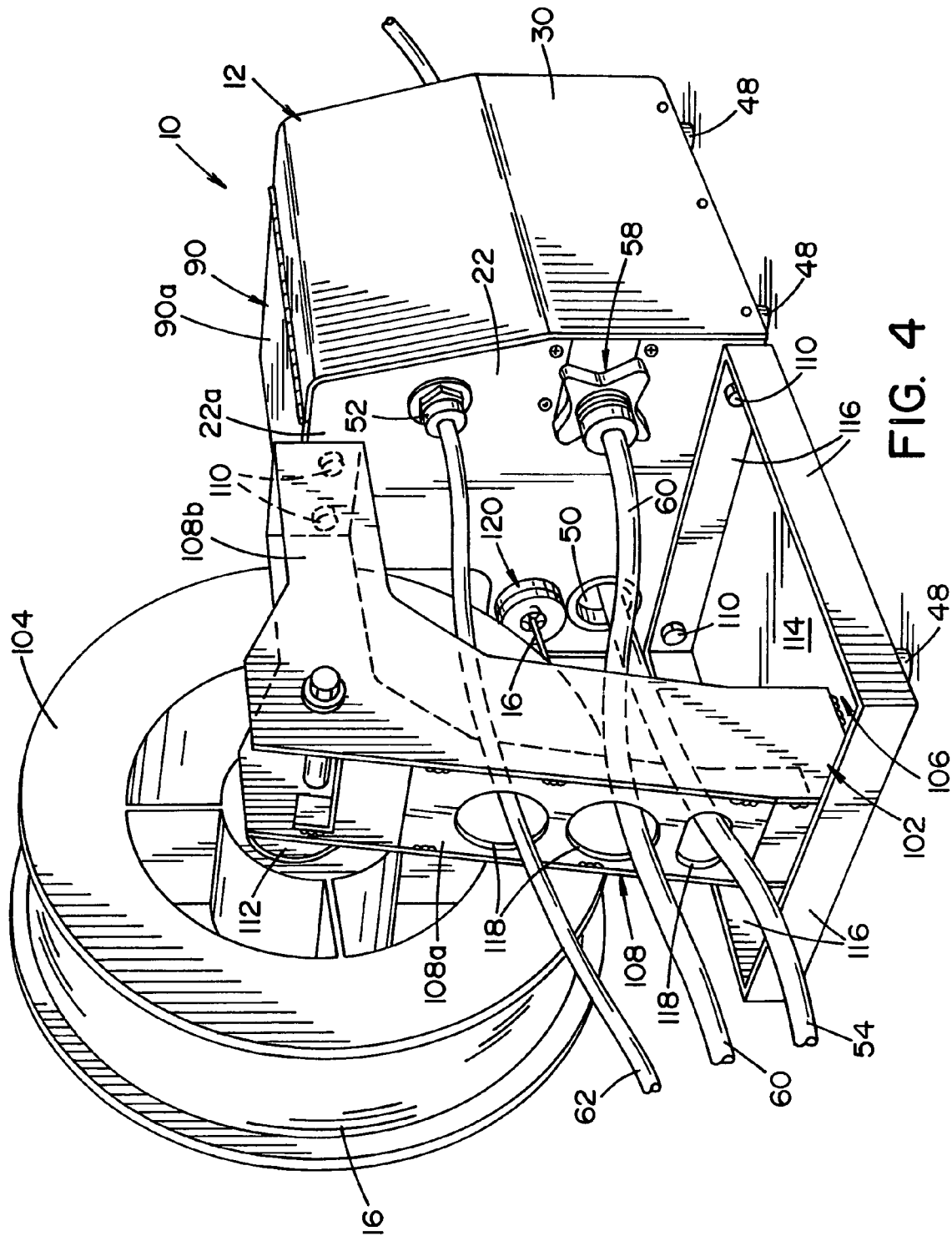
FIG. 4 is a rear perspective view of the portable wire feeder of FIG. 3.

With reference to FIGS. 3 and 4, the portable wire feeder 10 is shown converted for use with a wire spool in accordance with another preferred embodiment of the present invention. In the converted state, the portable wire feeder 10 additionally includes a wire spool support 102 that is connected to the housing 12 adjacent the rearward wall 22 and rotatably supporting a wire spool 104 from which wire 16 is pulled by the wire advancing mechanism 14 and payed forward to the gun 20. The wire spool 104 replaces the canister 32 as the wire supply 18 and the wire guide tube 34 is removed from the housing 12. It should be noted that while no rotation restriction device or brake is shown in connection with the wire spool 104, any such mechanism known in the art could used in connection with feeder 10 without departing from the present invention.

The wire spool support 102 includes a bin or base tray 106, also referred to herein as a wire spool support tray. Like the tray 80, the tray 106 is suitable for storing and/or transporting miscellaneous tools or items, including those typically carried by a user of a portable wire feeder. Additionally, the tray 106 serves as the base of the wire spool support 102 and can include feet 48 like the housing 12. An elevated member 108 is connected and extends from the tray 106. In the illustrated embodiment, the tray 106 and the elevated member 108 are removably connected to the housing 12 by bolts 110 which can be readily removed for converting the portable feeder 10 back for use with other wire supplies, such as the canister 18.

A spool retention member 112 is connected to the elevated member and is shaped to be received in a central opening of the spool 104 for allowing the spool to freely rotate. Thus, the spool retention member 112 rotatably supports the wire spool 104 thereby allowing wire 16 to be pulled from the spool by the wire advancing mechanism 14. The elevated member 108 is integrally formed with the base tray 106, such as, for example, by welding the member 108 to the tray 106.

In particular, the tray 106 includes a base wall 114 and a plurality of upstanding side walls 116. The elevated member 108 generally extends from the base wall 114 in a direction generally parallel to the side walls 116 of the tray 106. The elevated member 108 includes a vertical or router portion 108a and a horizontal portion 108b which is bolted to the housing 12. The router portion 108a includes a plurality of vertically spaced holes 118 for organizing and routing cables and/or wires connected to the housing 12. In the illustrated embodiment, the router portion 108a includes three holes 118 through which the power cable 54, the control cable 60 and the gas hose 62 each respectively pass. Although not illustrated, the support 102 can optionally include a gun holder for the gun 20 when not being used for welding.

With reference to FIGS. 2–4, the wire guide tube 34 is disconnected from the wire advancing mechanism 14 and removed from the housing 12 when the spool 104 is used. Moreover, a ball bearing inlet guide mechanism 120 is mounted on the housing 12 for directing the wire 16 from the spool 104 to the wire advancing mechanism 14. More particularly, the inlet guide mechanism 120 is secured within an opening 122 defined in the rearward end wall 22. As is known, the ball bearing inlet guide mechanism 120 reduces or eliminates surface damage to the wire 16 as it enters the housing 12 and, particularly, as an angle of the wire relative to an axis or centerline of the opening 122 increases as the wire is used from the spool 104. Eliminating surface wear or damage to the wire 16 has the effect of increasing the longevity of the wire 16.

Because the inlet mechanism 120 is known and does individually form a part of the present invention, no further reference numerals are provided but the mechanism 120 generally includes an entrance end provided with a plurality of closely spaced, spherical balls surrounding a passageway through which the wire 16 passes. The balls are arranged like a ball bearing and are normally hardened stainless steel. A race in a cap of the mechanism 120 forces the balls against a rear thrust ring so that the incoming wire 16 may rotate the balls by engaging the spherical surfaces of one or more of the balls as the wire 16 passes. To convert the feeder 10 back for use with the canister 32 or other type of wire supply, the inlet mechanism 120 and the support 102 are removed from the housing 12.

The invention has been described with reference to one or more preferred embodiments. Obviously, modifications and alterations will occur to others upon reading and understanding the preceding detailed description. It is intended that the invention be construed as including all such modifications and alterations insofar as they are within the scope of the appended claims or the equivalents thereof.

The invention claimed is:

1. A wire feeder for supplying consumable welding wire to a welding gun, comprising:
    a housing;
    a wire advancing mechanism connected to said housing for paying wire from a wire spool to a welding gun;
    a storage tray formed with said housing; and
    a wire spool support connected to said housing and rotatably supporting said wire spool, said wire spool support including: a wire spool support tray, an elevated member extending from said wire spool support tray, and a spool retention member connected to said elevated member and rotatably supporting said wire spool, said wire spool support tray including a base wall, a forward wall extending from said base wall, a rearward wall extending from said base wall in spaced relation relative to said forward wall and spaced apart side walls extending from said base wall and between said forward and rearward walls to define a storage area open on an upper end thereof.

2. The wire feeder of claim 1 wherein
    said storage tray is formed integrally with said housing adjacent an upper end thereof.

3. The wire feeder of claim 2 wherein said housing includes:
    a rearward housing end wall into which said wire spool provides said wire to said advancing mechanism; and
    a forward housing end wall spaced apart from said rearward housing end wall, said wire advancing mechanism positioned between planes generally defined by said rearward and said forward end walls, and said forward end wall having a wire guide tube extending therefrom to said welding gun for directing said wire from said wire advancing mechanism to said welding gun.

4. The wire feeder of claim 3 wherein said tray includes:
    a first tray end wall integrally formed with said forward housing end wall; and
    a second tray end wall integrally formed with said rearward housing end wall.

5. The wire feeder of claim 2 wherein said housing is formed of sheet metal.

6. The wire feeder of claim 1 wherein said storage tray includes a tray base wall formed in an upper portion of said housing and walls of the housing forming side walls of the tray extending upward from said tray base wall to define a storage area with an open end facing upward.

7. The wire feeder of claim 1 wherein walls of said storage tray are walls of said housing.

8. The wire feeder of claim 1 wherein said storage tray includes a storage tray base wall spaced apart from a lower end of said housing, said storage tray base wall and walls of said housing together forming said storage tray.

9. The wire feeder of claim 1 further including:
    a cover pivotally connected to said housing and moveable between an open position and a closed position wherein said tray and said wire advancing mechanism are covered.

10. The wire feeder of claim 8 wherein said cover in said closed position prevents egress of items in said storage tray from said storage tray.

11. The wire feeder of claim 1 further including a cover for selectively covering the wire advancing mechanism, said cover pivotal relative to said housing between a closed position and an open position.

12. A wire feeder for supplying consumable welding wire to a welding gun, comprising:
    a housing including:
        a forward housing end wall,
        a rearward housing end wall spaced from said forward housing end wall, and
        a housing base wall extending between said forward and said rearward housing end walls;
    a wire advancing mechanism connected to said housing for moving wire from a wire supply to a welding gun, said wire advancing mechanism positioned above said base wall and between planes generally defined by said forward and rearward housing end walls;
    said housing further including a dividing wall extending between said forward and rearward housing walls with said wire advancing mechanism positioned on one side of said dividing wall and a housing side wall extending between said forward and rearward housing walls, said housing side wall spaced apart from said dividing wall on an opposite side of said dividing wall from said wire advancing mechanism; and
    a storage tray formed with said housing, said storage tray including a tray base wall spaced apart from said housing base wall.

13. The wire feeder of claim 12 wherein said wire supply is one of a canister of coiled welding wire, a box of coiled welding wire and a spool of welding wire.

14. The wire feeder of claim 12 further including:
    a ball bearing inlet guide mechanism mounted on said housing for directing said wire from said wire supply to said advancing mechanism.

15. The wire feeder of claim 12 further including:
    a wire spool support connected to said housing adjacent said rearward housing end wall for receiving a spool of welding wire.

16. The wire feeder of claim 15 wherein said wire spool support includes:
    a base tray and an elevated member connected to said base tray, at least one of said base tray and said elevated member removably connected to said housing; and
    a spool retention member connected to said elevated member and shaped to be received in a central opening of a spool of welding wire to allow said spool of welding wire to rotate freely.

17. The wire feeder of claim 16 wherein said base tray and said elevated member are removably connected to said housing by bolts.

18. The wire feeder of claim 16 wherein said base tray and said elevated member are integrally formed.

19. The wire feeder of claim 16 wherein said elevated member extends from a base wall of said base tray in a direction generally parallel to side walls of said base tray.

20. The wire feeder of claim 16 wherein said elevated member includes a router portion for organizing and routing cables or wires connected to said housing.

21. The wire feeder of claim 20 wherein said router portion includes a plurality of vertically spaced holes.

22. The wire feeder of claim 16 wherein said elevated member includes a gun holder for retaining said welding gun when not used for welding.

23. The wire feeder of claim 12 further including:
wire feeder control mechanisms in said housing between said dividing wall and said housing side wall and between said forward and rearward housing end walls; and
one or more controls on at least one of said forward and rearward housing end walls operatively connected to said control mechanisms.

24. The wire feeder of claim 12 wherein said housing end walls and said dividing wall form walls of said tray.

25. The wire feeder of claim 12 further including a cover having a tray portion closing an open end of said tray and remaining portions that cooperate with said housing to enclose said wire advancing mechanism, said cover pivotally connected to said housing adjacent said housing side wall such that, when open, said remaining portions are remotely spaced from said wire advancing mechanism to allow easy access thereto.

26. The wire feeder of claim 12 further comprising:
a wire spool support connected to said housing and rotatably supporting a wire spool having wire thereon that is connected to said advancing mechanism, said wire spool support including:
a wire spool support tray having a support tray base wall and side walls extending from said support tray base wall to enclose a storage area on all sides thereof,
an elevated member extending from a bin, and
a spool retention member connected to said elevated member and rotatably supporting said wire spool.

27. The wire feeder of claim 26 wherein said wire spool support tray and said elevated member are removably connected to said housing.

28. The wire feeder of claim 26 wherein said elevated member includes a router portion for organizing and routing cables or wires connected to said housing.

29. The wire feeder of claim 28 wherein said router portion includes a plurality of vertically spaced holes.

30. The wire feeder of claim 12 wherein said storage tray is integrally formed with said housing.

31. The wire feeder of claim 30 wherein walls of said housing form walls of said storage tray.

* * * * *